March 29, 1938.  F. D. CHAPMAN  2,112,690
LIQUID HEAT TREATING SYSTEM
Filed Aug. 28, 1936  2 Sheets-Sheet 1
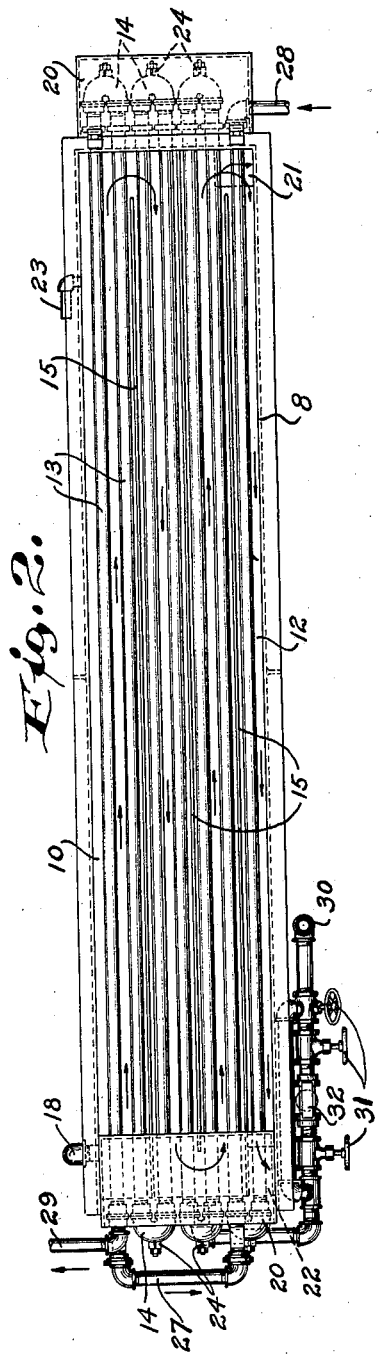
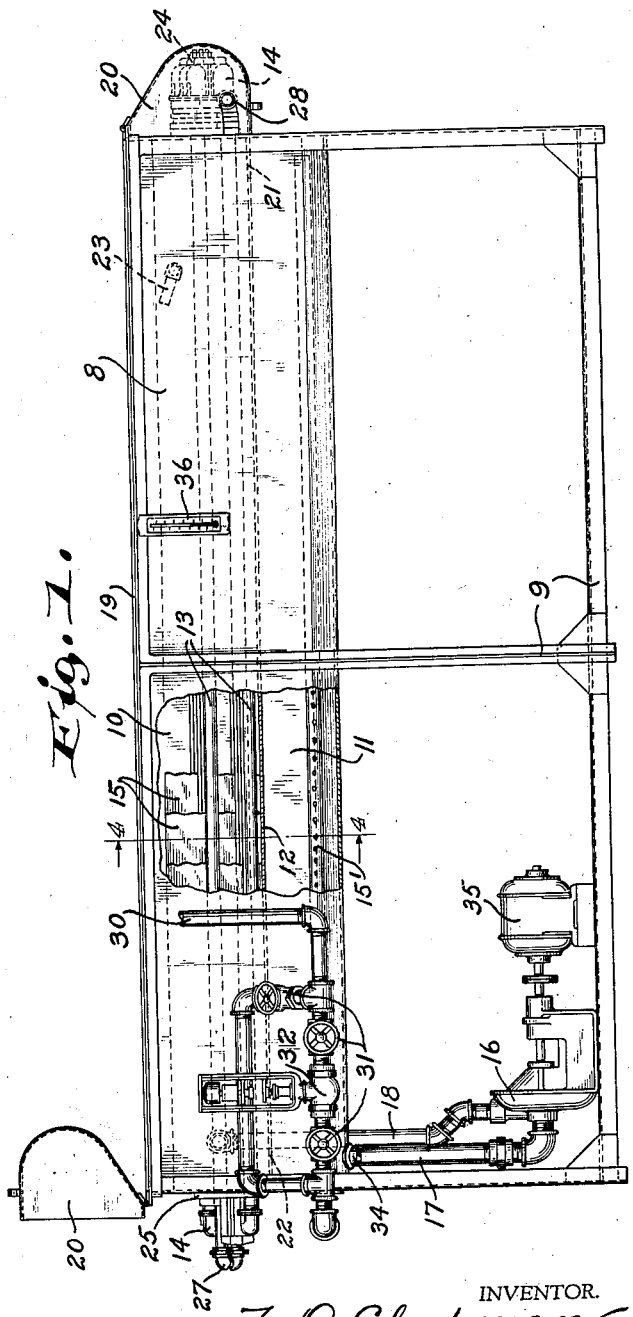
INVENTOR.
F. D. Chapman
BY Morsell, Lieber & Morsell
ATTORNEYS.

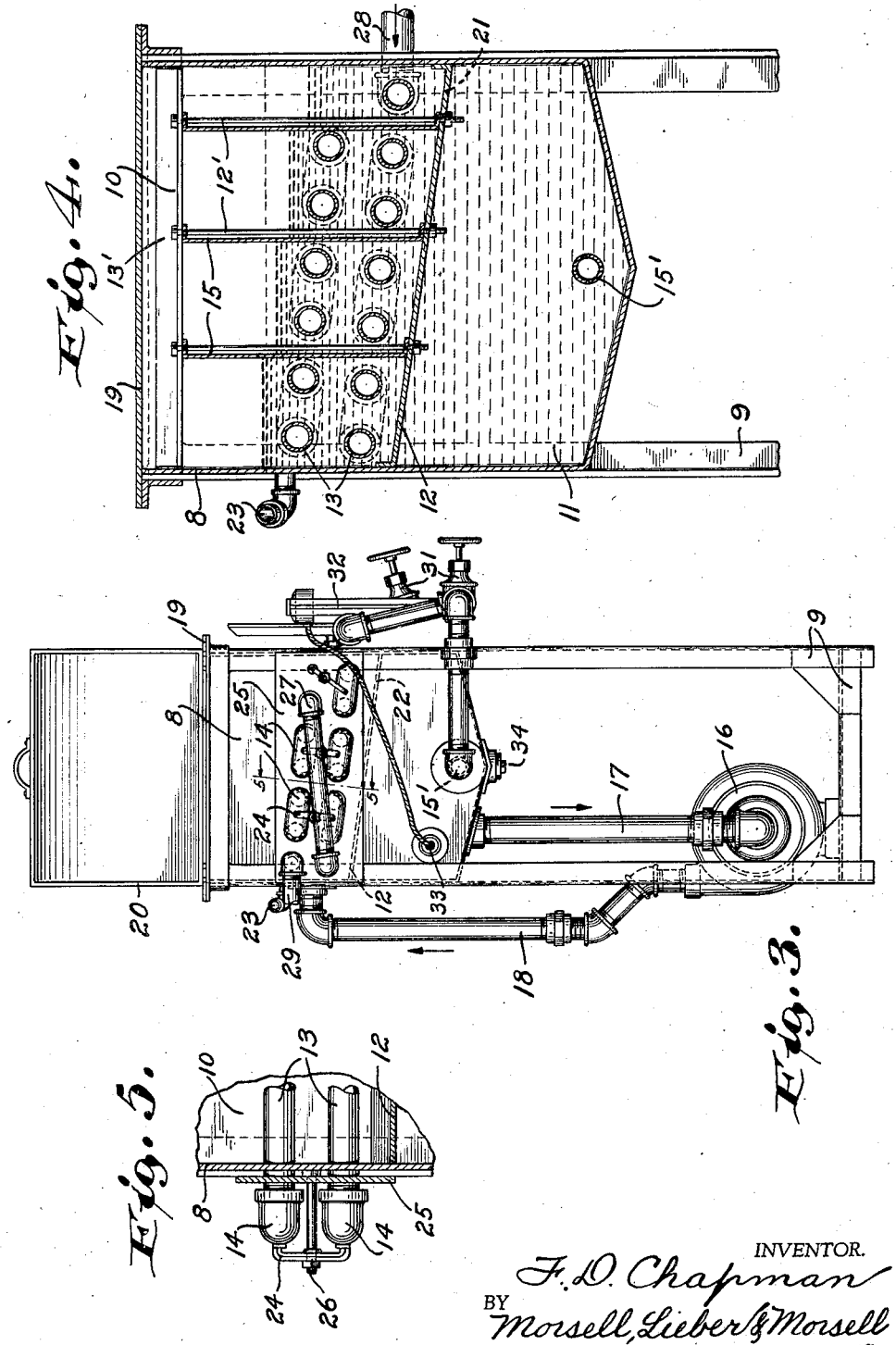

Patented Mar. 29, 1938

2,112,690

UNITED STATES PATENT OFFICE 2,112,690

LIQUID HEAT TREATING SYSTEM

Frank D. Chapman, Berlin, Wis.

Application August 28, 1936, Serial No. 98,349

7 Claims. (Cl. 257—240)

The present invention relates in general to improvements in the art of heat treating fluent materials, and relates more specifically to improvements in the construction and operation of systems for pasteurizing or sterilizing liquids such as fruit and vegetable juices preparatory to the packing thereof in containers for distribution to the public.

Generally defined, an object of my present invention is to provide an improved system for heat treating fluent commodities such as fruit and vegetable juices, which is extremely simple and compact, and which is moreover automatic and highly efficient in operation.

The heat treatment of certain liquids such as milk, fruit and vegetable juices for the purpose of pasteurizing or sterilizing these commodities, has heretofore presented many difficulties. It is desirable to uniformly heat treat all portions of the liquid without scorching or burning, thereby necessitating accurate temperature control while also permitting variations in the temperatures to which different products are subjected. The pasteurization or sterilization should also be effected constantly and effectively as the liquid is being transported through a conduit; and in order to conserve heat, it is desirable to enable re-use of the heat transferring medium such as water which should be maintained free from actual contact and intermingling with the commodities which are treated. None of the prior pasteurizers or sterilizers for materials in bulk, have been adapted to effectively meet all of these desirable conditions and requirements, and the prior systems are also relatively cumbersome, complicated and difficult to manipulate.

It is therefore a more specific object of my present invention to provide various improvements in the construction and operation of pasteurizing or sterilizing systems for liquid foods and beverages, whereby such systems will be adapted to most effectively heat treat various kinds of substances and especially milk and fruit or vegetable juices.

Another specific object of the invention is the provision of an improved liquid pasteurizer which is capable of uniformly heat treating the commodity as it is advancing in a constant stream through a conduit.

A further specific object of my invention is to provide improved liquid heat treating apparatus which is compact and durable in construction, and wherein the product is automatically and effectively sterilized without danger of dilution or pollution.

Still another specific object of this invention is to provide a pasteurizer which can be readily cleaned and thus maintained in sanitary condition, and which is operable with minimum waste of heat.

These and other specific objects and advantages will be apparent from the following detailed description.

A clear conception of the several features constituting the present improvement, and of the mode of constructing and of operating heat treating systems embodying the invention, may be had by referring to the drawings accompanying and forming a part of this specification wherein like reference characters designate the same or similar parts in the various views.

Fig. 1 is a side elevation of one of the improved heat treating units, showing one end cover elevated and also showing a portion of the main casing broken away so as to reveal internal structure;

Fig. 2 is a top view of the assemblage of Fig. 1, with the top closure cover removed;

Fig. 3 is a somewhat enlarged end view of the unit with the end cover thereof lifted to reveal normally concealed structure;

Fig. 4 is a further enlarged transverse vertical section through the unit, taken along the line 4—4 of Fig. 1; and Fig. 5 is a similarly enlarged fragmentary section through one end of the unit, taken along the line 5—5 of Fig. 3.

While the invention has been shown and described herein, as being specifically embodied in a pasteurizing unit of limited capacity especially adapted for the automatic heat treatment of liquid such as tomato juice, it is not the intent to thereby restrict the scope, since the invention is adapted for the sterilization or other heat treatment of various commodities such as milk, fruit juices and other liquids.

Referring to the drawings, the improved pasteurizing unit shown therein by way of illustration, comprises in general a main elongated casing 8 supported upon framing 9 and divided internally into upper and lower chambers 10, 11 by means of an inclined transverse partition 12; an elongated circuitous conduit consisting of horizontal parallel pipe sections 13 and return bends 14 for conducting the juice through the upper compartment 10; a series of parallel elongated substantially vertical partitions 15 extending upwardly from the inclined partition 12 between the pipe sections 13 and providing a relatively long path of travel for heating liquid through the upper chamber 10 and along the juice conveying conduit; a heating pipe 15' or coil for injecting heating medium such as steam into the liquid within the lower chamber 11; a centrifugal heating liquid circulating pump 16 supported by the framing 9 beneath the casing 8 and having suction and discharge pipes 17, 18 communicating respectively with the chambers 11, 10; and mechanism for automatically controlling the temperature of the heating medium.

The main tank or casing 8 may be formed of sheet metal and is normally enclosed at the top by means of a removable cover 19; and the return bends 14 of the commodity conveying conduit which are disposed beyond the ends of the casing 8, are normally concealed by hinged end covers 20, as clearly shown in Figs. 1 and 2. The transversely inclined partition 12 may also be formed of sheet metal or the like, welded or otherwise secured within the casing 8, and the lower portion of the partition 12 is provided with two end openings 21, 22 connecting the upper chamber 10 with the lower chamber 11. The upright partitions 15 may likewise be formed of sheet metal and are preferably removably attached to the inclined partition 12 by means of bolts 12' and transverse angle irons 13', and the outer of these partitions extend up to the front end (the left hand end of Fig. 1) of the casing 8 but are spaced from the rear end thereof, while the intermediate partition 15 extends up to the rear casing end but is spaced from the front end, thus providing an elongated trough for conducting the heating liquid back and forth within the upper chamber 10 as clearly illustrated in Fig. 2. The upper chamber 10 is also provided with an adjustable filling and overflow elbow 23 near the inlet stretch of the trough formed in this chamber, for initially supplying liquid to the heating chamber and for maintaining desired liquid levels therein.

The commodity conveying conduit comprises superimposed banks of pipe sections 13 and the corresponding adjacent ends of successive sections 13 are connected by the return bends 14 as clearly shown in Figs. 2, 3, and 5. The return bends 14 are readily removable to permit thorough cleaning of the interiors of the sections 13, and are normally held in place by clamps 24 secured to the fixed cross plates 25 by means of bolts 26, see Fig. 5. The superimposed banks of tubes are interconnected by a cross-pipe 27, and the commodity is admitted to the conveying conduit through an inlet pipe 28 while the heat treated product is conducted therefrom through a discharge pipe 29. Attention is particularly directed to the disposition of the pipe sections 13 within the heating liquid conducting trough sections and to the normal levels of the liquid within the latter as depicted in Fig. 4, these being of importance in securing uniform heat transfer.

The heating medium supply pipe 15' located within and extending along the bottom of the lower chamber 11, is preferably slotted or perforated for the delivery of steam or the like, which is supplied to the pipe 15' from an inlet pipe 30 past shut off valves 31 and a thermostatically controlled supply mechanism 32 shown in Fig. 1. This steam injection control mechanism is of relatively standard construction and is operable by suitable temperature controlled devices 33 to automatically regulate the temperature of the heating liquid between predetermined settings of the heat controller. The casing 8 may also be provided with a suitable clean out plug 34 located at any desired portion of the bottom of the lower chamber 11, so as to permit removal of sediment.

The centrifugal circulating pump 16 may be driven by an electric motor 35, and the pump suction pipe 17 connects directly with the bottom of the lower chamber 11, while the discharge pipe 18 communicates with the upper heating chamber 10 near the front end of the first trough section formed by the partitions 15. One or more thermometers 36 may also be applied to the heating liquid within the upper chamber 10 in order to indicate the temperature of the heating liquid. It is also to be noted, that while the heating liquid is flowing through the open trough in the chamber 10 in one direction, the liquid which is undergoing heat treatment is traveling through the confining conduit in the opposite direction although each trough section has therein pipe sections 13 through which the commodity is flowing both in the same and in the opposite direction as that of the heating medium.

During normal operation of the improved pasteurizing unit, the pump 16 is being operated by the electric motor 35, thereby constantly circulating heating liquid from the lower chamber 11 through the suction and discharge pipes 17, 18 respectively, and through the upper chamber 10. The tomato juice is being constantly admitted to the inlet 28 and passed through the pipe sections 13 and return bends 14, being eventually delivered in a constant stream through the outlet 29. Heating medium such as steam is being injected in regulated quantities from the supply pipe 30 through the coil 15' into the liquid within the lower chamber 11, and this admission of heating medium may be regulated to maintain the heating liquid at any desired temperature. As the heating liquid flows by gravity through the elongated trough formed by the upright partitions 15, and since the pump 16 is constantly withdrawing liquid from the chamber 11 through the suction pipe 17 and the liquid thus removed is supplied from the upper chamber 10 only through the openings 21, 22 in the lowest trough, the liquid within the successive trough sections will assume different levels as clearly illustrated in Fig. 4, thereby subjecting all of the pipe sections 13 through which the commodity is being conducted, to substantially uniform heating. The flow in each of the successive trough sections is substantially uniform and constant, and by virtue of the fact that the hottest heating liquid is applied to the commodity as it is leaving the pasteurizing unit, the heating of the commodity is uniform and thorough throughout the heating chamber. The relatively cool commodity entering the inlet pipe 28 passes successively through the lower and upper banks of tubes and is subjected in each of these banks to progressively hotter heating liquid in the several trough sections, and the flow of heating liquid in the several trough sections is substantially constant, thereby insuring most effective and gradual increase in the temperature of the commodity. The liquid discharged from the last trough section flows by gravity through the openings 21, 22 in the partition 12, and after being re-heated in the lower chamber 11, this liquid is returned by the pump to the inlet end of the elongated heating trough formed by the partitions 15.

It will thus be noted that the heat treatment is automatically and effectively accomplished and that all portions of the commodity passing through the heat transferring coil are uniformly heated. The control mechanism may be set to effectively regulate the temperatures of the heating liquid so as to avoid scorching or burning, and the apparatus may be utilized for the effective treatment of a great variety of commodities.

From the foregoing description, it will be apparent that the present invention provides an effective heating system which is extremely simple in assemblage and which is moreover highly efficient in operation. The apparatus, after being once set for treatment of a particular commodity, is entirely automatic in its operation, and by recirculating the same heat transferring liquid through the machine, the heat losses are reduced to a minimum. It is also to be noted that by virtue of the fact that the pipe sections 13 are disposed in superimposed banks, the lower of which is connected to the inlet 28 and the upper of which connects with the outlet 29, the successive pairs of adjoining tubes of each bank are subjected to the progressively hotter heating medium from the inlet to the outlet end thereof, thereby further increasing the efficiency of the heat transfer. It will also be seen that all portions of the improved apparatus are readily accessible for inspection and cleaning. The end covers 20 which normally conceal the return bends 14, may be lifted at any time so as to permit access to the clamping bolts 26 and clamps 24. Upon removal of the return bends 14, the interiors of the pipe sections 13 are freely accessible for cleaning. The top cover 19 permits access to the interior of the upper chamber 10 for cleaning purposes, and the pipe plug 34 permits rapid and complete withdrawal of the liquid from the main casing 8. When the top cover 19 has been removed, the bolts 12' may be removed from the angle irons 13' and from the nuts which are welded to the bottom of the partition 12, whereupon the upright partitions 15 may be entirely removed as a unit and the exteriors of the pipe sections 13 may then be thoroughly cleaned with steel wool or the like. Both the interiors and the exteriors of the pipe sections may thus be conveniently and thoroughly cleaned, thereby insuring most efficient heat transfer and augmenting the efficiency during normal operation. The liquid may be re-supplied to the casing 8 through the overflow elbow 23 which also serves to maintain the desired liquid levels in the sections of the trough formed by the partitions 15. The improved apparatus is extremely durable in construction, occupies minimum space and has proven highly successful in actual commercial use.

It should be understood that it is not desired to limit this invention to the exact details of construction and to the precise mode of use of the system herein shown and described, for various modifications within the scope of the claims may occur to persons skilled in the art.

I claim:

1. In combination, a casing having therein a transversely inclined partition forming upper and lower heating chambers connected by an opening at the lower side of said partition, walls extending upwardly from said partition to provide an elongated open trough in said upper chamber extending back and forth from one end of said casing to the other, a tortuous commodity conveying conduit extending throughout the length of said trough, means within said lower chamber for heating liquid delivered thereto through said opening, and means for admitting heated liquid from said lower chamber into the upper end of said trough.

2. In combination, a casing having therein a transversely inclined partition forming upper and lower heating chambers connected by an opening at the lower side of said partition, walls extending upwardly from said partition to provide an elongated open trough in said upper chamber extending back and forth from one end of said casing to the other, a tortuous commodity conveying conduit extending throughout the length of said trough and having adjoining interconnected sections located substantially the same distance from the bottom of the trough, means within said lower chamber for heating liquid delivered thereto through said opening, and means for admitting heated liquid from said lower chamber into the upper end of said trough.

3. In combination, a casing having therein a transversely inclined partition forming upper and lower chambers connected by an opening in said partition, walls extending upwardly from said partition to provide an elongated trough in said upper chamber extending back and forth from one end of said casing to the other, a tortuous commodity conveying conduit extending throughout the length of said trough and having adjoining end connected sections located substantially the same distance above said partition, means for heating liquid delivered into said lower chamber through said opening, and means for circulating heated liquid from said lower chamber into the upper end of said upper chamber.

4. In combination, a casing having therein a transversely inclined flat partition forming superimposed upper and lower chambers connected by an opening, walls cooperating with said partition to provide an elongated trough in said upper chamber extending back and forth from one end of said casing to the other, a commodity conveying pipe extending throughout the length of said trough, means for heating liquid delivered into said lower chamber through said opening, and means for conducting heated liquid from said lower chamber into said trough.

5. In combination, a casing having therein a transversely inclined flat partition forming superimposed upper and lower chambers connected by an opening, walls cooperating with said partition to provide an elongated trough in said upper chamber extending back and forth from one end of said casing to the other, a tortuous commodity conveying conduit extending throughout the length of said trough and comprising straight pipe sections located within said upper chamber above said partition and elbows connecting the adjacent ends of the successive sections and being located outside of said casing, means for heating liquid delivered into said lower chamber through said opening, and means for conducting heated liquid from said lower chamber into said trough.

6. In combination, a casing having therein a transverse partition forming upper and lower liquid confining chambers connected by an opening, walls extending upwardly from said partition to provide an elongated trough in said upper chamber extending back and forth from one end of said casing to the other, a tortuous commodity conveying pipe extending throughout the length of said trough closely adjacent to the upper surface of said partition, means within said lower chamber for heating liquid delivered through said opening, and means for conducting heated liquid from said lower chamber into said trough.

7. In combination, a casing having therein a transverse partition forming upper and lower liquid confining chambers connected by an opening, walls extending upwardly from said partition to provide an elongated trough in said upper chamber extending back and forth from one end of said casing to the other, a commodity conveying conduit extending throughout the length of said trough and comprising straight pipes within said upper chamber above said partition and elbows located outside of said casing and connecting the adjacent ends of the successive pipes, means for heating liquid delivered into said lower chamber through said opening, and means for conducting the heated liquid into said trough.

FRANK D. CHAPMAN.